United States Patent
Lucas et al.

(10) Patent No.: US 10,486,715 B2
(45) Date of Patent: Nov. 26, 2019

(54) CONTROL SYSTEM FOR A VEHICLE

(71) Applicant: PROTEAN ELECTRIC LIMITED, Surrey (GB)

(72) Inventors: Tom Lucas, Surrey (GB); Andrew Whitehead, Surrey (GB); Mark Potter, Surrey (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 0 days.

(21) Appl. No.: 16/065,655

(22) PCT Filed: Dec. 14, 2016

(86) PCT No.: PCT/IB2016/057610
§ 371 (c)(1),
(2) Date: Jun. 22, 2018

(87) PCT Pub. No.: WO2017/109645
PCT Pub. Date: Jun. 29, 2017

(65) Prior Publication Data
US 2019/0001990 A1    Jan. 3, 2019

(30) Foreign Application Priority Data

Dec. 23, 2015    (GB) .............................. GB1522849.7

(51) Int. Cl.
*B60W 10/06*    (2006.01)
*B60K 6/36*    (2007.10)
(Continued)

(52) U.S. Cl.
CPC ............ *B60W 50/082* (2013.01); *B60K 6/36* (2013.01); *B60K 6/387* (2013.01); *B60K 6/448* (2013.01);
(Continued)

(58) Field of Classification Search
CPC .... B60W 10/06; B60W 10/08; B60W 50/082; B60K 6/36; B60K 6/387
(Continued)

(56) References Cited

U.S. PATENT DOCUMENTS

2002/0023789 A1    2/2002    Morisawa et al.
2003/0171186 A1    9/2003    Okada et al.
(Continued)

FOREIGN PATENT DOCUMENTS

DE    4324010 A1    1/1995
EP    2439122 A1    4/2012
(Continued)

OTHER PUBLICATIONS

European Patent Office, European Search Report for EP2439122A1, dated Dec. 19, 2011, European Patent Office, Munich.
(Continued)

*Primary Examiner* — Kira Nguyen
(74) *Attorney, Agent, or Firm* — Nolte Intellectual Property Law Group (57) ABSTRACT

A control system for a vehicle having an electric motor for providing drive torque to at least one wheel of the vehicle, an internal combustion engine for providing drive torque to at least one wheel of the vehicle, a manual transmission unit having a user selectable gear ratio that includes at least one user selectable forward gear and/or reverse gear, and a clutch actuator, the control system comprising a controller arranged to have three user selectable modes of operation, wherein in a first mode of operation the controller is arranged to allow the clutch actuator to engage and disengage the internal combustion engine from the manual transmission unit based upon a user selection, wherein when the clutch actuator is arranged to engage the internal combustion engine with the manual transmission unit, torque generated by the internal
(Continued)

combustion engine is applied to the at least one wheel, and the electric motor is arranged to provide drive torque to the at least one wheel of the vehicle based on whether the user has selected the at least one forward gear or the at least one reverse gear; and in a second mode of operation the controller is arranged to allow the clutch actuator to engage and disengage the internal combustion engine from the manual transmission unit based upon a user selection, and to prevent the electric motor from providing drive torque to the at least one wheel of the vehicle; and in a third mode of operation the controller is arranged to allow the electric motor to provide drive torque to the at least one wheel of the vehicle based on whether the user has selected the at least one forward gear or the at least one reverse gear and to configure the clutch actuator to disengage the internal combustion engine from the manual transmission unit.

10 Claims, 6 Drawing Sheets (51) Int. Cl.
*B60W 50/08* (2012.01)
*B60K 6/448* (2007.10)
*B60K 6/52* (2007.10)
*B60W 10/08* (2006.01)
*F16D 48/06* (2006.01)
*B60W 20/10* (2016.01)
*B60K 6/387* (2007.10)
*B60K 6/48* (2007.10)
*B60K 6/547* (2007.10)
*B60K 7/00* (2006.01)
*B60W 20/20* (2016.01)

(52) U.S. Cl.
CPC ............... *B60K 6/48* (2013.01); *B60K 6/52* (2013.01); *B60K 6/547* (2013.01); *B60K 7/0007* (2013.01); *B60W 10/06* (2013.01); *B60W 10/08* (2013.01); *B60W 20/10* (2013.01); *B60W 20/20* (2013.01); *F16D 48/06* (2013.01); *B60W 2540/16* (2013.01); *B60W 2710/0666* (2013.01); *B60W 2710/083* (2013.01); *B60Y 2200/92* (2013.01); *Y02T 10/6243* (2013.01); *Y02T 10/6265* (2013.01); *Y02T 10/6286* (2013.01)

(58) Field of Classification Search
USPC ........................................................... 701/22
See application file for complete search history.

(56) References Cited

U.S. PATENT DOCUMENTS

| 2008/0228369 | A1  | 9/2008  | Stroh et al. |
| 2009/0234549 | A1  | 9/2009  | Silveri et al. |
| 2011/0118077 | A1* | 5/2011  | Kawasaki ............ B60K 6/445 477/3 |
| 2011/0166733 | A1  | 7/2011  | Yu et al. |
| 2013/0252773 | A1* | 9/2013  | Suntharalingam ..... B60K 6/387 475/5 |
| 2014/0051545 | A1  | 2/2014  | Berry et al. |
| 2015/0307086 | A1  | 10/2015 | Ketfi-Cherif et al. |
| 2018/0257650 | A1* | 9/2018  | Meyer ................ B60W 50/082 |

FOREIGN PATENT DOCUMENTS

| GB | 2453415 A    | 4/2009 |
| GB | 2484938 A    | 5/2012 |
| JP | 2002114048 A | 4/2002 |
| JP | 2002155965 A | 5/2002 |
| JP | 2012062027 A | 3/2012 |
| JP | 2012106536 A | 6/2012 |
| WO | 2004028848 A1 | 4/2004 |
| WO | 2015040632 A2 | 3/2015 |

OTHER PUBLICATIONS

European Patent Office, International Search Report, dated Jun. 29, 2017, WIPO, Rijswijk.
European Patent Office, Written Opinion of the International Searching Authority, dated Jun. 29, 2017, WIPO, Munich.
Intellectual Property Office, Combined Search and Exam Report, dated Feb. 15, 2016, IPO, South Wales.
Intellectual Property Office, Search Report First, dated Feb. 12, 2016, IPO, South Wales.
Intellectual Property Office, Search Report for GB2453415A, dated Jan. 6, 2009, IPO, South Wales.
Intellectual Property Office, Search Report for GB2484938A, dated Nov. 10, 2010, IPO, South Wales.

* cited by examiner

CONTROL SYSTEM FOR A VEHICLE

The present invention relates to a control system, in particular a control system for a vehicle.

With increased interest being placed in environmentally friendly vehicles there has, perhaps unsurprisingly, been a corresponding increase in interest in the use of electric vehicles and electric hybrid vehicles.

However, due to the large number of existing road vehicles requiring the use of fossil fuels this is likely to slow the rate at which electric vehicles are adopted.

One solution to this problem would be to retrofit existing vehicles, which operate using an internal combustion engine, with an electric motor, where the electric motor is arranged to drive either the same wheels powered by the engine or a number of wheels not coupled to the engine. This would allow the existing fossil fuel refuelling infrastructure to be used to supplement the electrical charging infrastructure available for electric vehicles.

However, having a vehicle with two separate, independent, drivetrains, namely an internal combustion engine and a motor drive source, will require either an automated transmission system that can coordinate the operation of both the drive sources, or for a vehicle without an automated transmission system to have two separate drive selectors for allowing a driver to select between engine drive torque and motor drive torque.

It is desirable to improve this situation.

In accordance with an aspect of the present invention there is provided a system according to the accompanying claims.

The present invention as claimed provides the advantage of simplifying the process of retrofitting an electric drive motor to a vehicle in which an internal combustion engine is used to provide a drive torque via a manual gearbox. The present invention allows the manual gearbox to be used to control the application of drive torque from the internal combustion engine, while the gear selection can be used to determine an appropriate drive torque that needs to be provided by the electric drive motor, whether the vehicle is in an internal combustion engine only mode, an electric drive motor only mode or a hybrid mode.

The present invention will now be described, by way of example, with reference to the accompanying drawings, in which.

The embodiment of the invention described is for a control system for allowing a manual gear selector for a manual gearbox to be used to control the application of drive torque generated by an internal combustion engine and an electric drive motor, either together or individually.

For the purposes of the present embodiment the electric drive motors are in the form of electric motors for use in a wheel of a vehicle, however the electric motors may be located anywhere within the vehicle. The motors are of the type having a set of coils being part of a stator for attachment to a vehicle, radially surrounded by a rotor carrying a set of magnets for attachment to a wheel. In addition, some of the aspects of the invention are applicable to an arrangement having the rotor centrally mounted within radially surrounding coils. As would be appreciated by a person skilled in the art, the present invention is applicable for use with other types of electric motors or drive systems.

Figure 1:
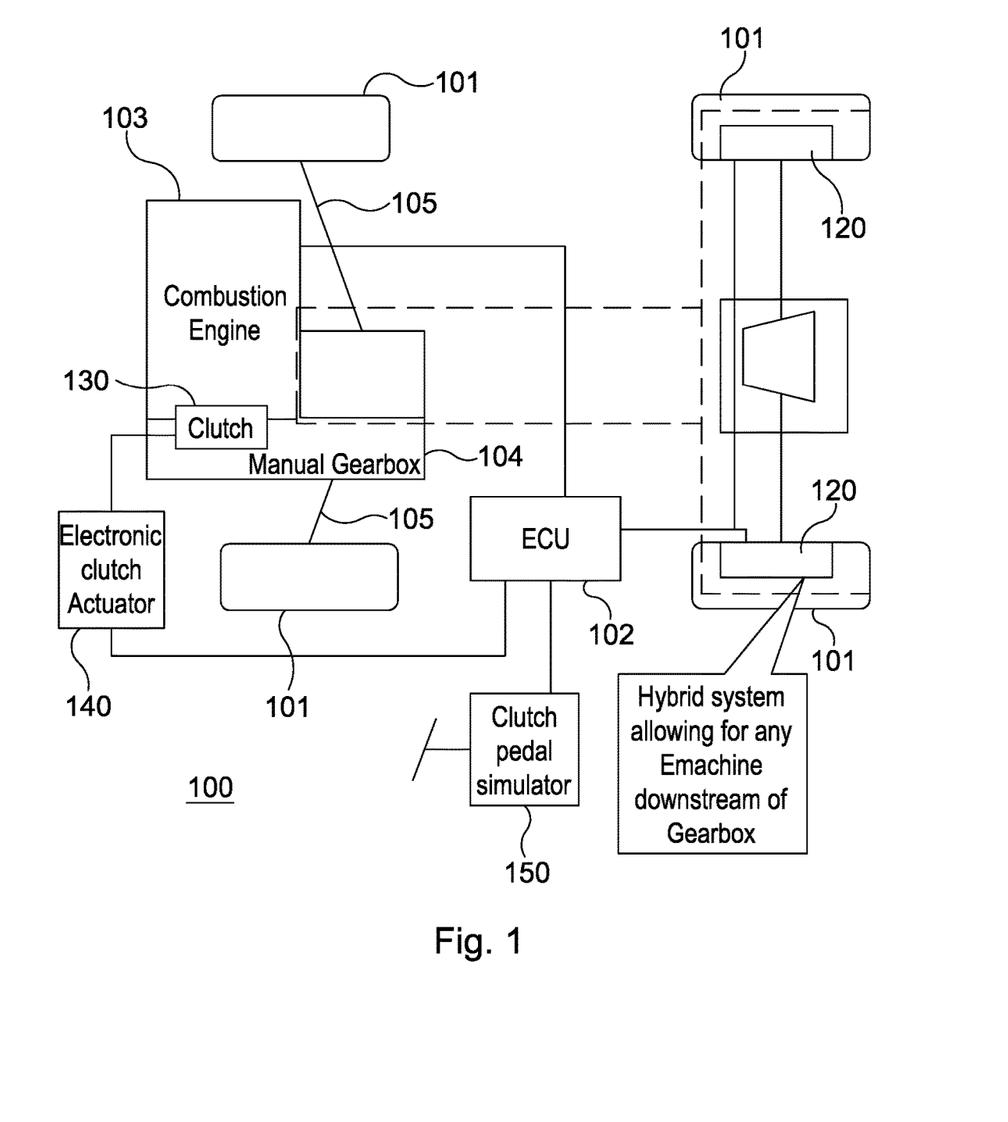
FIG. 1 illustrates a vehicle according to an embodiment of the present invention.

FIG. 1 illustrates a vehicle 100, for example a car or lorry, having four wheels 101, where two wheels are located in the vehicles forward position in a near side and off side position respectively. Similarly, two additional wheels are located in the vehicles aft position in near side and off side positions respectively, as is typical for a conventional car configuration. However, as would be appreciated by a person skilled in the art, the vehicle may have any number of wheels.

Incorporated within the wheels 101 in the vehicle's aft position are in-wheel electric motors 120, where each in-wheel electric motor acts as a drive source for each respective wheel, as described in detail below. Although the current embodiment describes a vehicle having in-wheel electric motors 120 associated with the wheels 101 located in the vehicle's aft position, as would be appreciated by a person skilled in the art the in-wheel electric motors can be located in other wheels. For example, in-wheel electric motors can be located in the front two wheels. Additionally, although the present embodiment describes the use of in-wheel electric motors, other electric motor configurations can be used, for example a centrally mounted electric motor that uses a drive shaft to power the respective vehicles wheels. However, for ease of retrofitting the use of in-wheel electric motors is the preferred embodiment.

Coupled to the in-wheel electric motors 120 and to a vehicle communication bus, for example a CAN bus (not shown), is a control unit 102 for controlling, in response to a driver input, the torque generated by the in-wheel electric motor.

Also located in the vehicle is an internal combustion engine 103 that is coupled to the two front wheels via a manual gear box 104, otherwise known as a transmission unit, and drive shafts 105, where a clutch 130 is used to mechanically connect and disconnect the internal combustion engine 103 from the gearbox 104 for allowing torque generated by the internal combustion engine 103 to be applied to the two front wheels, as described below. As would be well known to a person skilled in the art, the term 'transmission unit' may also include the drive shafts 105.

Although the manual gearbox may include a single forward gear and/or reverse gear, preferably the gearbox includes a plurality of forward gears having different gear ratios and a single reverse gear, which may have a gear ratio the same as one of the forward gears or different. The gears are manually selected by a user using a gear selector (not shown) coupled to the gearbox.

For the purposes of the present embodiment, the torque produced by the internal combustion engine 103 and the in-wheel electric motors 120 are controlled by a driver of the vehicle via a throttle pedal (not shown) situated in the vehicle, as described below.

Additionally, the vehicle includes an electronic clutch actuator 140 and a clutch pedal simulator 150 that are in communication with the control unit 102, where the control unit 102 is arranged to control the electronic clutch actuator 140 dependent upon the operational mode that the control unit has been placed in and in response to the operation of the clutch pedal simulator 150. The clutch pedal simulator 150 is arranged to simulate the feel and operation of a conventional clutch pedal, however, instead of the clutch pedal simulator directly controlling the operation of a clutch, the clutch pedal simulator is in communication with the control unit 102, where, as stated above, the control unit 102 controls the operation of the clutch based upon the mode of operation the control unit 102 has been placed in and upon operation of the clutch pedal simulator 150.

When the electronic clutch actuator 140 is placed in an actuated state by the control unit 102, the electronic clutch actuator 140 is arranged to cause the clutch 130 to mechanically connect the internal combustion engine 103 to the gearbox 104. When the electronic clutch actuator 140 is placed in an unactuated state by the control unit 102, the electronic clutch actuator 140 is arranged to cause the clutch 130 to mechanically disconnect the internal combustion engine 103 from the gearbox 104

Figure 2:
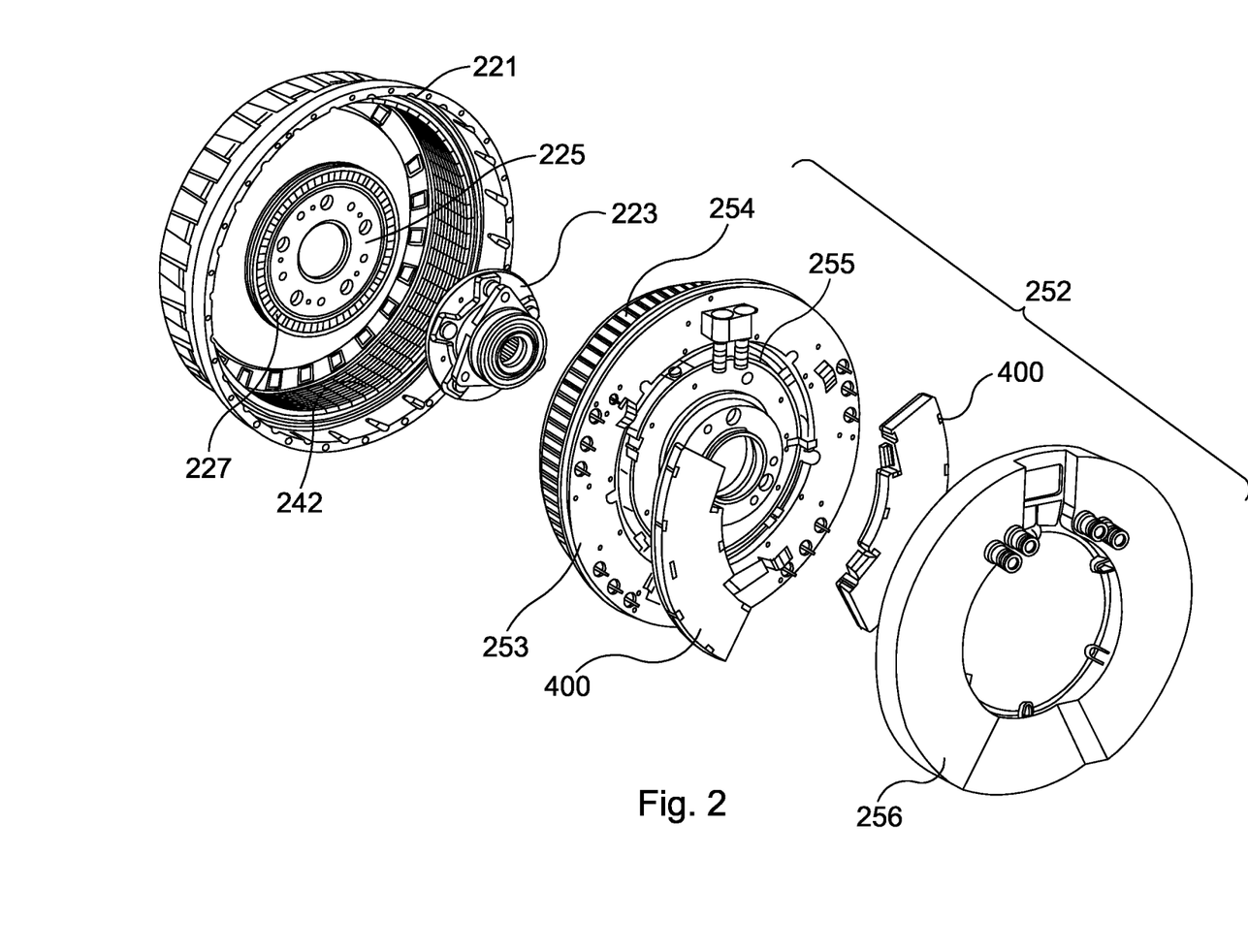
FIG. 2 illustrates an exploded view of an electric motor as used in an embodiment of the present invention.
Figure 3:
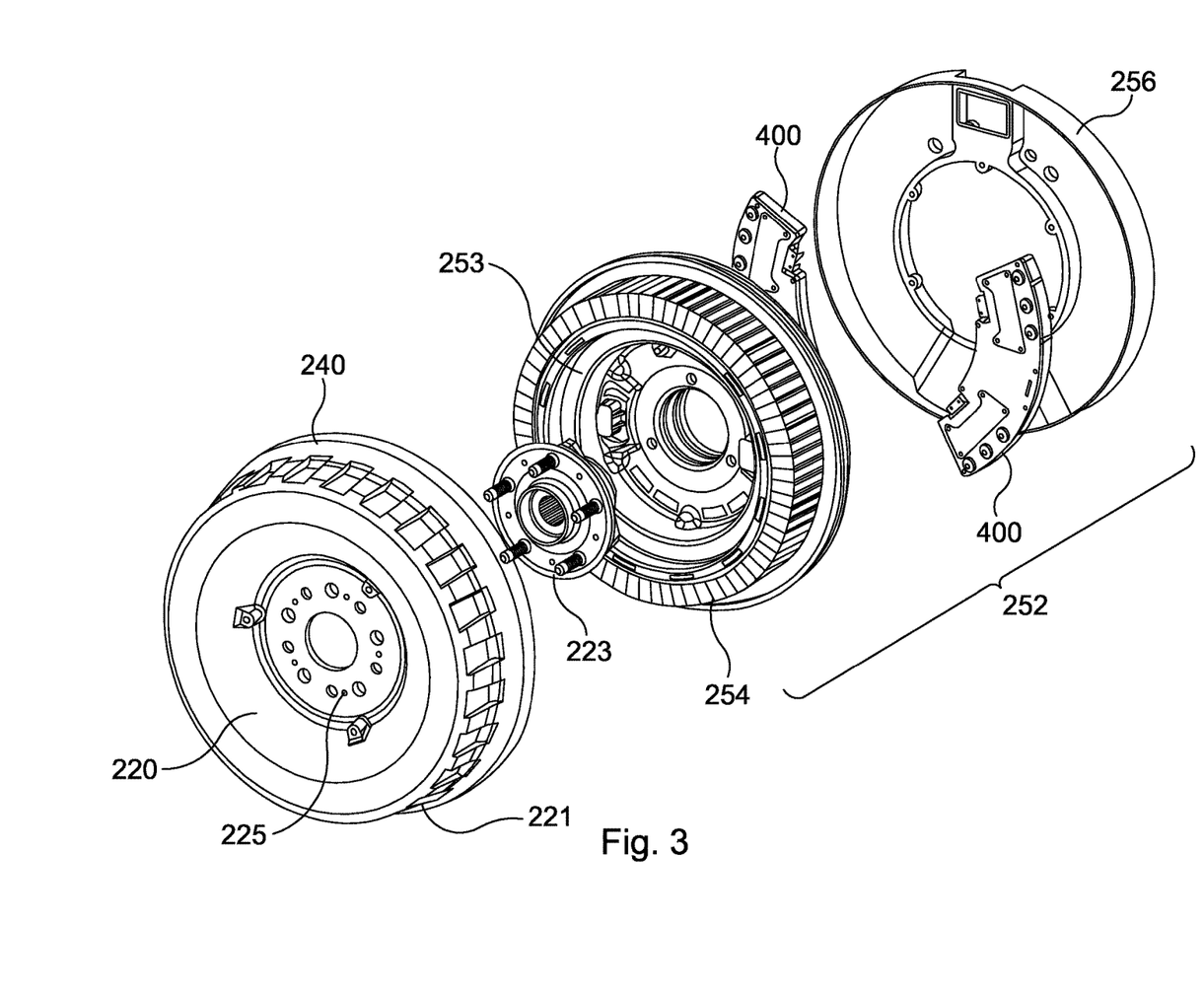
FIG. 3 illustrates an exploded view of the electric motor shown in FIG. 2 from an alternative angle.

For the purposes of the present embodiment, as illustrated in FIG. 2 and FIG. 3, the in-wheel electric motor includes a stator 252 comprising a heat sink 253, multiple coils 254, two control devices 400 mounted on the heat sink 253 on a rear portion of the stator for driving the coils, and an annular capacitor, otherwise known as a DC link capacitor, mounted on the stator within the inner radius of the control devices 400. The coils 254 are formed on stator tooth laminations to form coil windings. A stator cover 256 is mounted on the rear portion of the stator 252, enclosing the control devices 400 to form the stator 252, which may then be fixed to a vehicle and does not rotate relative to the vehicle during use.

Figure 4:
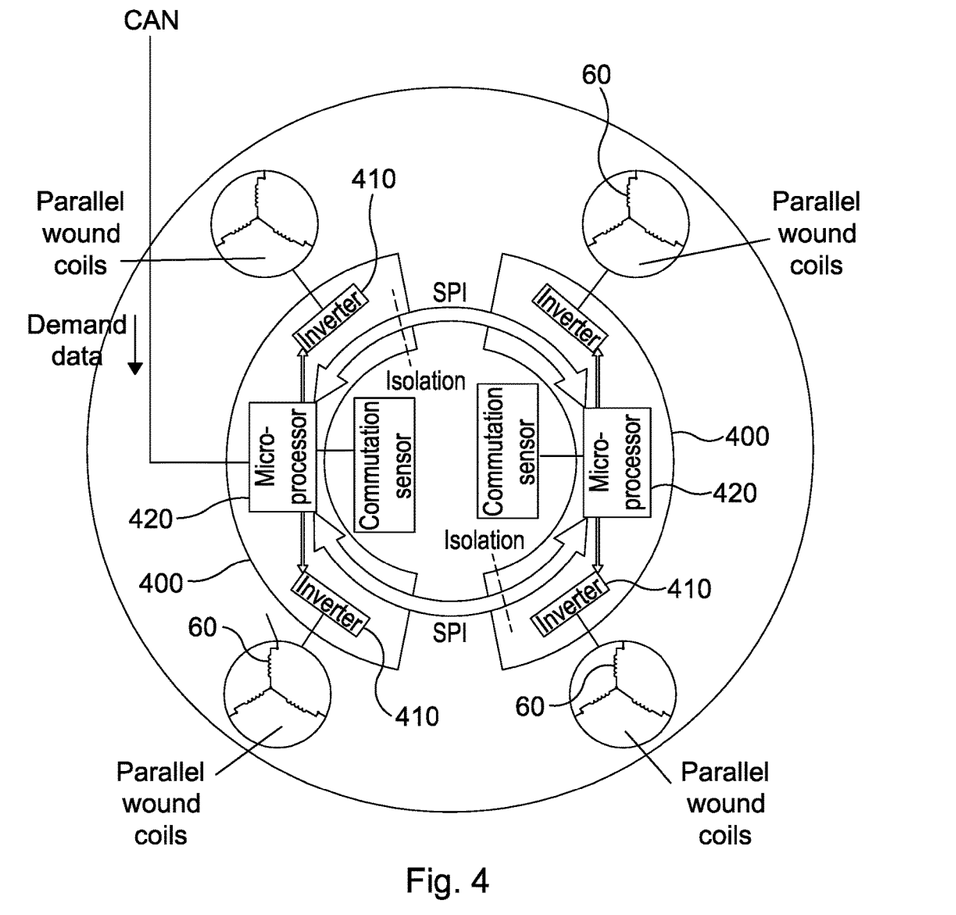
FIG. 4 illustrates an electric motor according to an embodiment of the present invention.

Each control device 400 includes two inverters 410 and control logic 420, which in the present embodiment includes a processor, for controlling the operation of the inverters 410, which is schematically represented in FIG. 4.

Although for the purposes of the present embodiment the in-wheel electric motor includes two control devices, where each control device includes control logic, in other words a controller, for controlling the operation of an inverter, any configuration of control logic and inverter combination may be used, including placing the control logic and/or inverters remote to the electric motor.

The annular capacitor is coupled across the inverters 410 and the electric motor's DC power source for reducing voltage ripple on the electric motor's power supply line, otherwise known as the DC busbar, and for reducing voltage overshoots during operation of the electric motor. For reduced inductance the capacitor is mounted adjacent to the control devices 400. Accordingly, current flow to the electric motor is via the DC busbar, where the electric motor acts as an electrical load to the DC power source with the DC power source's voltage being placed across the DC busbar. As described below, a current sensor is used to measure the DC busbar line current to the electric motor.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 3 shows an exploded view of the same motor assembly illustrated in FIG. 2 from the opposite side. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor, where the AC voltage signal output by the Hall sensor can be used for both rotor position detection and for determining rotor velocity ($\omega$).

For improved position detection, preferably the sensor includes an associated second sensor placed 90 electrical degrees displaced from the first sensor.

In the present embodiment the electric motor includes four coil sets with each coil set having three coil sub-sets that are coupled in a wye configuration to form a three phase sub-motor, resulting in the motor having four three phase sub-motors. The operation of the respective sub-motors is controlled via one of the two control devices 400, as described below. However, although the present embodiment describes an electric motor having four coil sets (i.e. four sub motors) the motor may equally have one or more coil sets with associated control devices. In a preferred embodiment the motor includes eight coil sets 60 with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

FIG. 4 illustrates the connections between the respective coil sets 60 and the control devices 400, where a respective coil set 60 is connected to a respective three phase inverter 410 included on a control device 400 for controlling current flow within the respective coil sets. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases.

Figure 5:
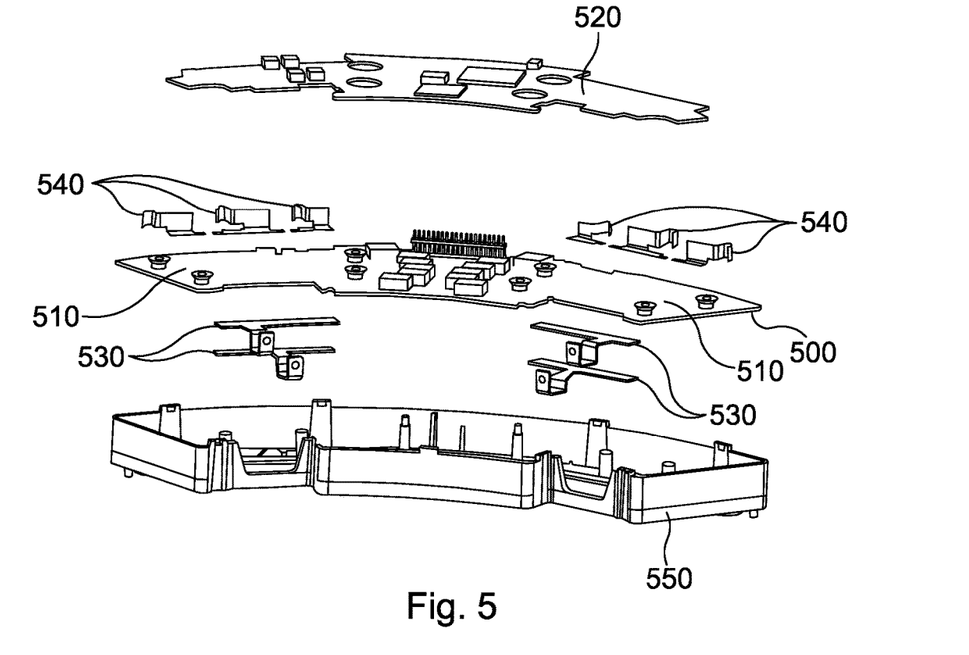
FIG. 5 illustrates an exploded view of a control device according to an embodiment of the present invention.

Preferably, the control devices 400 are of a modular construction. FIG. 5 illustrates an exploded view of a preferred embodiment, where each control device 400, otherwise known as a power module, includes a power printed circuit board 500 in which are mounted two power substrate assemblies 510, a control printed circuit board 520, four power source busbars 530 for connecting to a DC battery, and six phase winding busbars 540 for connecting to respective coil windings. Each of the control device components are mounted within a control device housing 550 with the four power source busbars 530 being mounted on an opposite side of the control device housing 550 to the phase winding busbars 540.

As stated above, current flow to the electric motor, in other words the line current, is via the respective power source busbars, where the electric motor acts as an electrical load to the DC power source with the DC power source's voltage being placed across the respective power source busbars.

Each power substrate 510 is arranged to be mounted in a respective aperture formed in the power printed circuit board 500.

The power printed circuit board 500 includes a variety of components that include drivers for the inverter switches formed on the power substrate assemblies 510, where the drivers are typically used to convert control signals into a suitable form to turn the inverter switches on and off.

The control printed circuit board 520 includes a processor for controlling the operation of the inverter switches. Additionally, each control printed circuit board 520 includes an interface arrangement to allow communication between the respective control devices 400 via a communication bus with one control device 400 being arranged to communicate with a vehicle controller mounted external to the electric motor. The processor 420 on each control device 400 is arranged to handle communication over the interface arrangement.

As stated above, the processors 420 on the respective control devices 400 are arranged to control the operation of the inverter switches mounted on the respective power substrates 520 within the control housing 550, thereby allowing each of the electric motor coil sets 60 to be supplied with a three phase voltage supply resulting in the respective coil sub-sets generating a rotating magnetic field. As stated above, although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide pulse width modulation PWM voltage control across the respective coil sub-sets, thereby generating a current flow in the respective coil sub-sets for providing a required torque by the respective sub-motors, where the current flow in the respective coil sub-sets is known as phase current.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the phase current within the coil sub-sets to be achieved.

For a given coil set 60 the three phase bridge inverter 410 switches are arranged to apply a single voltage phase across each of the coil sub-sets.

Figure 6:
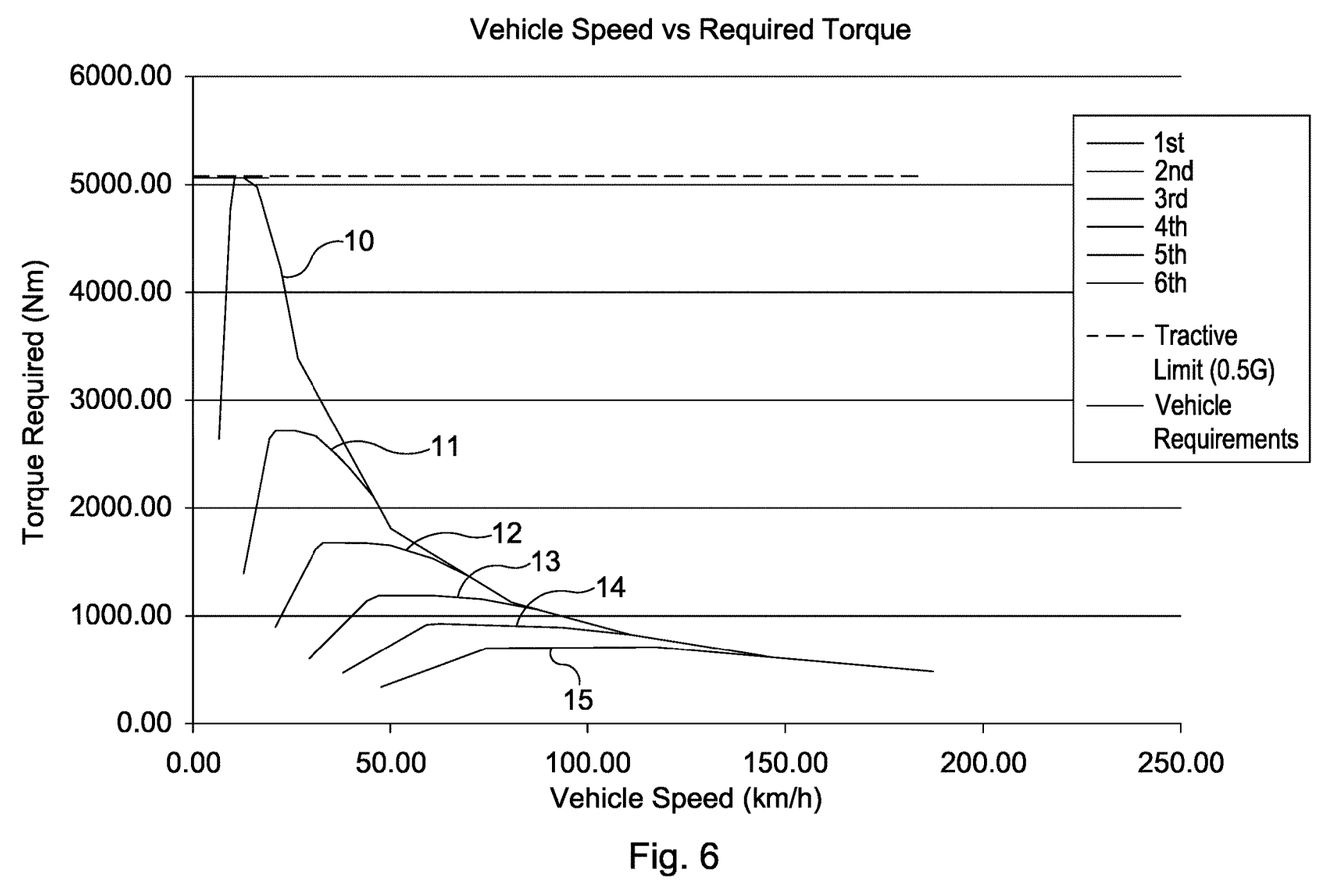
FIG. 6 illustrates a speed/torque for a vehicle according to an embodiment of the present invention.

Using PWM switching, the plurality of switches are arranged to apply an alternating voltage across the respective coil sub-sets. The voltage envelope and phase angle of the electrical signals is determined by the modulating voltage pulses. FIG. 6 illustrates an example of phase currents in a coil set having three coil sub-sets, otherwise known as a three phase motor configuration, showing three phases.

The inverter switches can include semiconductor devices such as MOSFETs or IGBTs. In the present example, the switches comprise IGBTs. However, any suitable known switching circuit can be employed for controlling the current. For a three phase inverter having six switches configured to drive a three phase electric motor, the six switches are configured as three parallel sets of two switches, where each pair of switches is placed in series and form a leg of the three phase bridge circuit, with a fly-back diode, otherwise known as a reverse diode, coupled in anti-parallel across each switch. A single phase inverter will have two pairs of switches arranged in series to form two legs 600 of an inverter.

As stated above, PWM switching is used to apply an alternating voltage to the electric motors coil windings, where the rotor speed is dependent upon the amplitude of the voltage applied across the coil windings. The torque applied to the rotor results from phase current within the coil windings, where motor torque is proportional to the amplitude of the phase current.

In response to driver input, for example via the throttle pedal, upon engagement of the electric motors, the control unit 102 communicates required torque values to the respective in-wheel electric motors, where the control devices for the respective in-wheel electric motors are arranged to control the phase current within the coil windings to provide the requested torque values.

The control unit 102 is arranged to allow a user to place the vehicle in one of three modes of operation, where the control unit 102 allows the control of the operation of the internal combustion engine, the in-wheel electric motors, the gearbox, the electronic clutch actuator and the clutch to be influenced based on the selected mode of operation. The mode of operation is selectable by a user using any suitable means, for example, via an actuating device within the vehicle.

In a first mode of operation, the vehicle drive torque is provided by both the internal combustion engine and the in-wheel electric motors.

In a second mode of operation, the vehicle drive torque is provided solely by the internal combustion engine.

In a third mode of operation, the vehicle drive torque is provided solely by the in-wheel electric motors.

In the first mode of operation (i.e. hybrid mode), the internal combustion engine is switched on with the control unit 102 arranged to enable the electric motors 120, thereby allowing both the internal combustion engine and the electric motors to provide a drive torque for the vehicle.

In the first mode of operation the control unit 102 is arranged to control the actuation of the electronic clutch actuator 140 based on the operation of the clutch pedal simulator 150, where the control unit 102 is arranged to place the electronic clutch actuator 140 in an unactuated state upon the clutch pedal simulator 150 being selected by a user of the vehicle, for example via depression of the clutch pedal simulator 150 and place the electronic clutch actuator 140 in an actuated state upon the clutch pedal simulator 150 being deselected, for example by the user of the vehicle removing pressure from the clutch pedal simulator 150.

Accordingly, the internal combustion engine 103 is arranged to apply torque to the two front wheels 101 via selection of a suitable gear using the clutch pedal simulator and gear selection used in a conventional manner in combination with the operation of a throttle pedal (not shown). The operation of the clutch pedal simulator 150 is arranged to cause the clutch to mechanically connect/disconnect the gearbox 104 from the internal combustion engine during the gear selection process. The torque applied by the internal combustion engine to the wheels is dependent on the engine torque and the selected gear of the gearbox 104, as is well known to a person skilled in the art.

By way of illustration, FIG. 6, shows a typical speed/torque profile applied to wheels of a vehicle by an internal combustion engine for a gear box having 6 gears, where profile 10 illustrates the maximum torque applied in first gear, profile 11 illustrates the maximum torque applied in second gear, profile 12 illustrates the maximum torque applied in third gear, profile 13 illustrates the maximum torque applied in fourth gear, profile 14 illustrates the maximum torque applied in fifth gear, profile 15 illustrates the maximum torque applied in sixth gear.

In addition to torque being applied by the internal combustion engine, as stated above, torque is also applied by the electric motors.

Accordingly, in the first mode of operation, upon a user arranging for the clutch actuator to engage the internal combustion engine with the manual transmission unit the controller allows the torque generated by the internal combustion engine, where torque generated by the electric motors may or may not be determined by the gear ratio selected in the manual transmission unit.

Within the present embodiment, as the electric motors operate independently of the gearbox, in the first mode of operation the amount of torque generated by the electric motors may be determined by various means.

In a first preferred embodiment the maximum speed of the vehicle is limited to the acceptable range of the gear that is currently selected. This means that the electric motors will have their torque reduced as the speed increases to the point where the engine is close to exceeding the maximum rpm for the selected gear, where preferably motor drive torque will be reduced to zero when the engine is close to exceeding its maximum rpm. In other words, the torque generated by the respective electric motors is arranged to mirror the torque values generated by the internal combustion engine.

Accordingly, the driver will always be in the correct gear to allow the driver to freely use the clutch to engage or disengage the engine as it sees fit to get the best economy/emissions/performance.

In an alternative embodiment, the clutch may be used to disengage the engine if the torque generated by the electric motors is going to result in the engine operating out of its working range for the gear that it is in, thereby resulting in the vehicle entering an electric only mode. This may result in the vehicle being "stuck" in electric-only mode as a result of the vehicle travelling too fast for the selected gear. In this scenario the driver would need to change to an appropriate gear before reengaging the engine. Based on which of the two embodiments is adopted, the vehicle will have different behaviours for maximum throttle depending on whether the vehicle speed is in an operating range for a selected gear.

In the second mode of operation, the internal combustion engine is switched on with the control unit 102 arranged to disable the electric motors 120 or place the electric motors 120 in a mode where torque demanded of the electric motors is independent of the throttle pedal position. In the second mode of operation the control unit 102 is arranged to control the actuation of the electronic clutch actuator 140 based on the operation of the clutch pedal stimulator 150, where the control unit 102 is arranged to place the electronic clutch actuator 140 in an unactuated state upon the clutch pedal simulator 150 being selected by a user of the vehicle, for example via depression of the clutch pedal simulator 150 and place the electronic clutch actuator 140 in an actuated state upon the clutch pedal simulator 150 being deselected, for example by the user of the vehicle removing pressure from the clutch pedal simulator 150.

Accordingly, the internal combustion engine 103 is arranged to apply torque to the two front wheels 101 via selection of a suitable gear using the clutch pedal simulator and gear selection used in a conventional manner in combination with the operation of a throttle pedal (not shown), where a speed/torque profile is applied to the wheels of the vehicle based on the gear selected, as described above.

The operation of the clutch pedal simulator 150 is arranged to cause the clutch to mechanically connect/disconnect the gearbox 104 from the internal combustion engine during the gear selection process. The torque applied by the internal combustion engine to the wheels is dependent on the engine torque and the selected gear of the gearbox 104, as is well known to a person skilled in the art.

In the third mode of operation, drive torque is provided solely by the electric motors 120 with the control unit 102 arranged to enable the electric motors 120. Typically the internal combustion engine will be switched off, however the internal combustion engine may continue to run, where it could be used, for example to provide charge to the battery used by the electric motors.

In the third mode of operation the control unit 102 is arranged to place the electronic clutch actuator 140 in an unactuated state, independent of the operation of the clutch pedal simulator 150, thereby causing the clutch 130 to mechanically disconnect the internal combustion engine 103 from the gearbox. Accordingly, the internal combustion engine is decoupled from the transmission, thereby preventing the internal combustion engine being a source of drag whilst the vehicle is moving under the operation of the in-wheel electric motors. The drive torque applied to the vehicle is provided solely by the electric motors, where the torque generated is determined by the control unit based on the operation of the throttle pedal.

Accordingly, when in the third mode of operation the electrically actuated clutch actuator would disengage the engine from the gearbox, thus minimising any drag torque and allowing for engine cranking without drive load. The driver could use the clutch and change gears but this action would have no effect, other than to give the control unit some input to provide the "feeling" of gear shift for comfort and feel.

Consequently, in the first and second modes of operation the clutch pedal is used by the driver to engage/disengage the internal combustion engine from the gearbox, as is well known to a person skilled in the art. However, in the third mode of operation, the EV mode the clutch pedal would have no effect, other than to give the control unit some input to provide the "feeling" of gear shift.

In a preferred embodiment of the third mode of operation, if a gear has been selected, the drive torque for the electric motors is limited so that the maximum speed of the vehicle is limited to the acceptable range of the selected gear. This means that the electric motors will have their torque reduced as the speed increases to the point, where the engine is close to exceeding the maximum rpm for the selected gear, where preferably motor drive torque will be reduced to zero when the engine is close to exceeding its maximum rpm. This has the advantage of allowing a user of the vehicle to switch seamlessly between the third mode of operation and first and/or second mode of operation without there being a disparity between the torque being provided between the electric motors and the internal combustion engine.

Similarly, if the control unit identifies that the vehicle exceeds a predetermined threshold value for a selected gear ratio, the control unit is arranged to prevent a user selection of the first mode of operation or the second mode of operation.

The invention claimed is:

1. A control system for a vehicle having an electric motor for providing drive torque to at least one wheel of the vehicle, an internal combustion engine for providing drive torque to at least one wheel of the vehicle, a manual transmission unit having at least one user selectable forward gear and/or reverse gear, and a clutch actuator, the control system comprising a controller arranged to have three user selectable modes of operation, wherein in a first mode of operation the controller is arranged to allow the clutch actuator to engage and disengage the internal combustion engine from the manual transmission unit based upon a user selection, wherein when the clutch actuator is arranged to engage the internal combustion engine with the manual transmission unit, torque generated by the internal combustion engine is applied to the at least one wheel, and electric motor is arranged to provide drive torque to the at least one wheel of the vehicle based on whether the user has selected the at least one forward gear or the at least one reverse gear; and in a second mode of operation the controller is arranged to allow the clutch actuator to engage and disengage the internal combustion engine from the manual transmission unit based upon a user selection, and to prevent the electric motor from providing drive torque to the at least one wheel of the vehicle; and in a third mode of operation the controller is arranged to allow the electric motor to provide drive torque to the at least one wheel of the vehicle based on whether the user has selected the at least one forward gear or the at least one reverse gear and to configure the clutch actuator to disengage the internal combustion engine from the manual transmission unit.

2. A control system according to claim 1, wherein the manual transmission unit includes a plurality of user selectable gear ratios and the controller is arranged to allow the torque generated by the electric motor to be determined by the gear ratio selected by the user in the manual transmission unit.

3. A control system according to claim 1, wherein, when the controller is in the first mode of operation the controller is arranged to substantially maintain a predetermined relationship between the torque generated by the internal combustion engine and the electric motor.

4. A control system according to claim 1, wherein the manual transmission unit includes a plurality of user selectable gear ratios, wherein, when the controller is in the first mode of operation or the third mode of operation, the controller is arranged to limit the maximum speed of the vehicle based upon the gear ratio selected by the user.

5. A control system according to claim 1, wherein the manual transmission unit includes a plurality of user selectable gear ratios, wherein, the controller is arranged to switch from the first mode of operation to the third mode of operation if the speed of the vehicle exceeds a predetermined threshold value for a selected gear ratio.

6. A control system according to 1, wherein the manual transmission unit includes a plurality of user selectable gear ratios, wherein, when the controller is in the third mode of operation, the controller is arranged to prevent a user selection of the first mode of operation or the second mode of operation if the speed of the vehicle exceeds a predetermined threshold value for a selected gear ratio.

7. A vehicle having an electric motor for providing drive torque to at least one wheel of the vehicle, an internal combustion engine for providing drive torque to at least one wheel of the vehicle, a manual transmission unit having at least one user selectable forward gear and/or reverse gear, a clutch actuator and a control system having an electric motor for providing drive torque to at least one wheel of the vehicle, an internal combustion engine for providing drive torque to at least one wheel of the vehicle, a manual transmission unit having at least one user selectable forward gear and/or reverse gear, and a clutch actuator, the control system comprising a controller arranged to have three user selectable modes of operation, wherein in a first mode of operation the controller is arranged to allow the clutch actuator to engage and disengage the internal combustion engine from the manual transmission unit based upon a user selection, wherein when the clutch actuator is arranged to engage the internal combustion engine with the manual transmission unit, torque generated by the internal combustion engine is applied to the at least one wheel, and electric motor is arranged to provide drive torque to the at least one wheel of the vehicle based on whether the user has selected the at least one forward gear or the at least one reverse gear; and in a second mode of operation the controller is arranged to allow the clutch actuator to engage and disengage the internal combustion engine from the manual transmission unit based upon a user selection, and to prevent the electric motor from providing drive torque to the at least one wheel of the vehicle; and in a third mode of operation the controller is arranged to allow the electric motor to provide drive torque to the at least one wheel of the vehicle based on whether the user has selected the at least one forward gear or the at least one reverse gear and to configure the clutch actuator to disengage the internal combustion engine from the manual transmission unit.

8. A vehicle according to claim 7, further comprising a plurality of in-wheel electric motors.

9. A vehicle according to claim 7, wherein the clutch actuator is arranged to engage and disengage the internal combustion engine from the manual transmission unit via a clutch.

10. A vehicle according to claim 7, wherein the clutch actuator is arranged to engage and disengage the internal combustion engine from the manual transmission unit based upon the operation of a clutch pedal by the user.

* * * * *